(12) United States Patent  
Fritz et al.

(10) Patent No.: US 8,096,765 B2  
(45) Date of Patent: Jan. 17, 2012

(54) WIND TURBINE ROTOR BLADES WITH ENHANCED LIGHTNING PROTECTION SYSTEM

(75) Inventors: Peter James Fritz, Greenville, SC (US); Richard Hardison, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/957,715

(22) Filed: Dec. 1, 2010

(65) Prior Publication Data

US 2011/0142644 A1 Jun. 16, 2011

(51) Int. Cl.  
*F03D 11/00* (2006.01)

(52) U.S. Cl. ...................... 416/62; 416/146 R (58) Field of Classification Search ............... 416/1, 62, 416/146 R, 229 R; 361/218  
See application file for complete search history.

(56) References Cited

U.S. PATENT DOCUMENTS

| | | | |
|---|---|---|---|
| 6,457,943 B1 * | 10/2002 | Olsen et al. | 416/230 |
| 7,040,864 B2 * | 5/2006 | Johansen et al. | 416/146 R |
| 7,390,169 B2 * | 6/2008 | Larsen et al. | 416/146 R |
| 2006/0280613 A1 * | 12/2006 | Hansen | 416/230 |
| 2009/0129927 A1 | 5/2009 | Grabau | |
| 2009/0196751 A1 * | 8/2009 | Jacobsen et al. | 416/146 R |

\* cited by examiner

*Primary Examiner* — Edward Look  
*Assistant Examiner* — Dwayne J White  
(74) *Attorney, Agent, or Firm* — Dority & Manning, P.A.

(57) ABSTRACT

A wind turbine rotor blade includes a plurality of lightning receptors configured along either or both of the pressure side or suction side of the blade. At least one looped lightning conductive circuit is provided, with the lightning receptors configured in communication with a respective lightning conductive circuit. The lightning conductive circuit has terminal ends that extend through the root for connection of each terminal end with a grounding system within the wind turbine. The looped lightning conductive circuit provides a redundant path to each lightning receptor for conducting a lightning strike to ground.

12 Claims, 7 Drawing Sheets

WIND TURBINE ROTOR BLADES WITH ENHANCED LIGHTNING PROTECTION SYSTEM

FIELD OF THE INVENTION

The present subject matter relates generally to wind turbines, and more particularly to wind turbine rotor blades having a lightning protection system configured therewith.

BACKGROUND OF THE INVENTION

Large commercial wind turbines are prone to lightning strikes and, in this regard, it is a common practice to provide the turbine blades with lightning receptors spaced along the longitudinal length of the blade so as to capture and conduct the strikes to ground. The conventional configuration of these receptors, however, results in difficult, expensive, and time-consuming maintenance and diagnostic procedures that typically require a crane to externally access each receptor. The conventional configuration does not offer a means to verify the continuity of the receptors within a blade without accessing and testing each receptor individually. In addition, the effectiveness of the receptors depends on the integrity and reliability of a single conductive path along the blade. Failure (i.e., a break) of this path renders any upstream receptors essentially useless.

Efforts have been made to devise alternative lightning protection systems for wind turbine blades. For example, U.S. Patent Publication No. 2009/0129927 describes a system that avoids blade mounted receptors altogether by mounting radially extending lightning receptors to the rotor hub, with the receptors extending between the blades. This configuration, however, may result in increased weight, drag, and noise, and an overall decrease in the capability of the turbine.

Accordingly, the industry would benefit from an improved lightning protection system that utilizes blade-mounted receptors, yet avoids the disadvantages of conventional receptor configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine rotor blade has a root, a tip, and a pressure side and a suction side that extend between the tip and root and define an internal cavity of the blade. A plurality of lightning receptors are configured along either or both of the pressure side or the suction side. At least one looped lightning conductive circuit is provided, which may be within the internal cavity of the blade or external to the blade. The lightning receptors are configured in communication with a respective lightning conductive circuit. The lightning conductive circuit includes terminal ends that extend through the root for connection of each of the terminal end with a grounding system within the wind turbine, for example within a hub of the wind turbine. In this manner, the looped conductive circuit provides a redundant path to each lightning receptor for conducting a lightning strike to ground.

The blade may include a single lightning conductive circuit with all of the lightning receptors in communication with the single circuit. In an alternate embodiment, the blade may include a plurality of the lightning conductive circuits, with each of the circuits including a plurality of the lightning receptors in communication therewith. The plurality of lightning conductive circuits may share a common leg.

In a particularly unique embodiment, the lightning receptors are configured in series within their respective looped lightning conductive circuit. With this embodiment, the looped lightning conductive circuit may also define a continuity circuit for the lightning receptors that are connected in series within said looped lightning conductive circuit.

The invention also encompasses a wind turbine having one or more turbine blades configured with a lightning conductive circuit as described herein.

In other embodiments, a wind turbine rotor blade has a root, a tip, and a pressure side and a suction side that extend between the tip and root and define an internal cavity of the blade. A plurality of lightning receptors are configured along either or both of the pressure side or the suction side. At least one continuity circuit is provided. This continuity circuit may be configured within the internal cavity of the blade, or external to the blade. The lightning receptors are disposed in series within a respective continuity circuit such that an electrical continuity path defined by the circuit passes through each of the lightning receptors within the continuity circuit. The continuity circuit further includes terminal ends that extend through the root and are accessible for conducting a remote continuity check of the lightning receptors within the continuity circuit, for example within a rotor hub on which the blade is mounted.

The blade may include a single continuity circuit with all of the lightning receptors in series within the circuit. In an alternate embodiment, the blade may include a plurality of the continuity circuits, with each of the circuits including a plurality of the lightning receptors. The plurality of continuity circuits may share a common return leg, or may have individual respective return legs.

The lightning receptors may be variously configured. In a particular embodiment, the receptors include spaced apart terminal posts and the continuity circuit includes a plurality of conductive wires that interconnect the terminal posts of adjacent lightning receptors such that the conductive path flows from one of the terminal posts, through the lightning receptor, and out from the other terminal post. In still a further embodiment, the lightning receptors have a single terminal post and the continuity circuit includes a plurality of conductive wires that interconnect the single terminal posts of the multiple receptors such that a first one and a second one of the conductive wires are mounted to each single terminal post with a dielectric insulating material therebetween.

In unique embodiments, all or part of the continuity circuit may also define all or a portion of a lightning conductive path that connects the lightning receptors in series. For example, in one embodiment, the entire continuity circuit defines a lightning conductive path and, in this manner, a redundant lightning conductive path is provided for each lightning receptor in the event of a break in the continuity circuit at any one location.

The present invention also encompasses any configuration of a wind turbine having one or more blades with a continuity circuit as described herein.

The present invention also encompasses various method embodiments for verifying functionality of lightning receptors in a wind turbine blade by defining one or more continuity circuits wherein each of the lightning receptors configured on the wind turbine blade is included within at least one continuity circuit. The method includes configuring the lightning receptors in series within a respective continuity circuit such that an electrical continuity path within the circuit passes through each lightning receptor within the continuity circuit.

A continuity check is conducted at terminal ends of the continuity circuit. This check may be done on a periodic or continuous basis.

In a particular method embodiment, a plurality of the continuity circuits are defined for an individual respective turbine blade, with each continuity circuit comprising a plurality of lightning receptors. A common return leg may be provided for the plurality of circuits, or each circuit may have its own respective return leg.

Another method embodiment may include configuring at least one leg of the continuity circuit as a lightning conductive path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
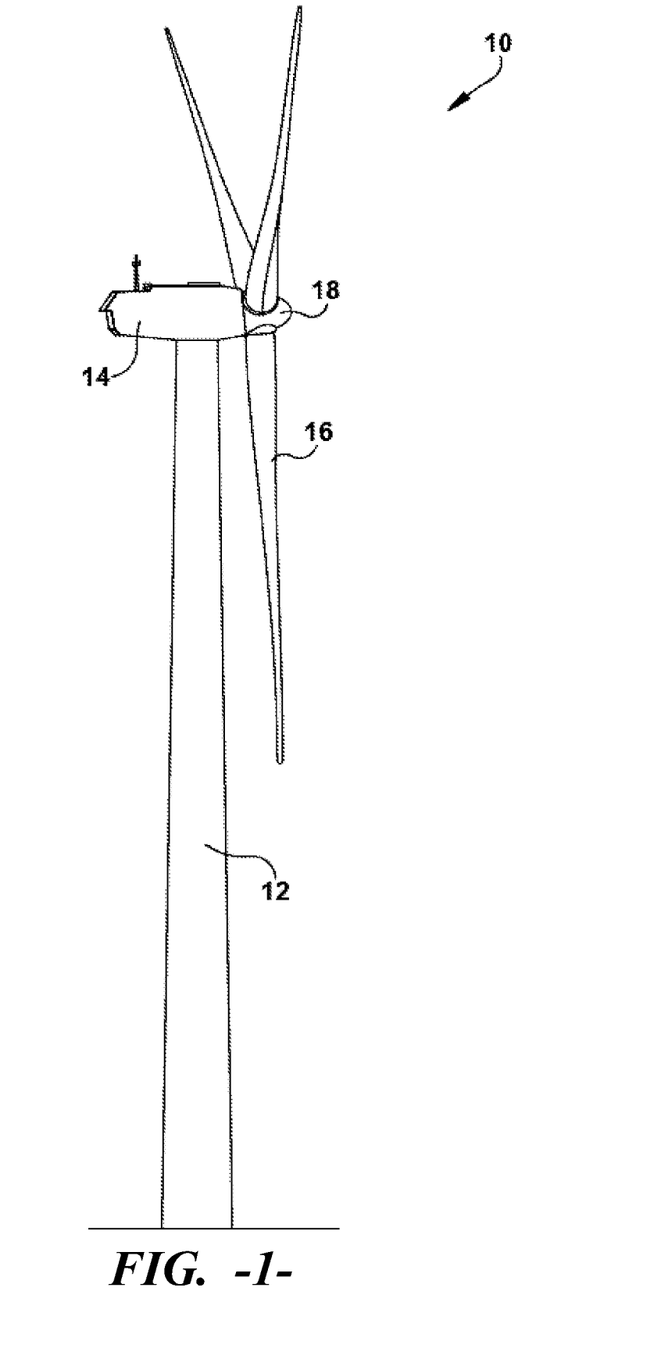
FIG. 1 illustrates a perspective view of a conventional wind turbine.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes rotor blades 16 coupled to and extending radially outward from the hub 18. As shown, the rotor hub 18 includes three rotor blades 16. However, in an alternative embodiment, the rotor hub 18 may include more or less than three rotor blades 16.

The rotor blades 16 may generally have any suitable length that enables the wind turbine 10 to function according to design criteria. For example, the rotor blades 16 may have a length ranging from about 15 meters (m) to about 91 m. However, other non-limiting examples of blade lengths may include 10 m or less, 20 m, 37 m, or a length that is greater than 91 m. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIGS. 2 through 5 in general, a wind turbine rotor blade 16 is provided having a root 30, a tip 32, a pressure side 34, and a suction side 36. The pressure side 34 and suction side 36 extend between the root 30 and tip 32 and define an internal cavity 38 for the blade 16. A plurality of lightning receptors 40 are configured along either or both of the pressure side 34 or suction side 36. For example, in the embodiment illustrated in figures, a plurality of the lightning receptors 40 are provided on each of the pressure side 34 and suction side 36. In an alternative embodiment, the lightning receptors 40 may be provided on only one of the sides 34, 36. In the embodiments wherein the lightning receptors 40 are configured in series in a continuity circuit, as in FIGS. 2 and 3, each receptor 40 is uniquely configured in series with the wires or other conducting members that define the continuity circuit, as described in greater detail below.

The lightning receptors 40 may be variously configured within the scope of the invention, and include any metal or metalized component (i.e., a metal screen, a metal rod or tip, and the like) mounted on the pressure or suction sides 34, 36 of the blade for the purpose of conducting lightning strikes to ground.

Figure 2:
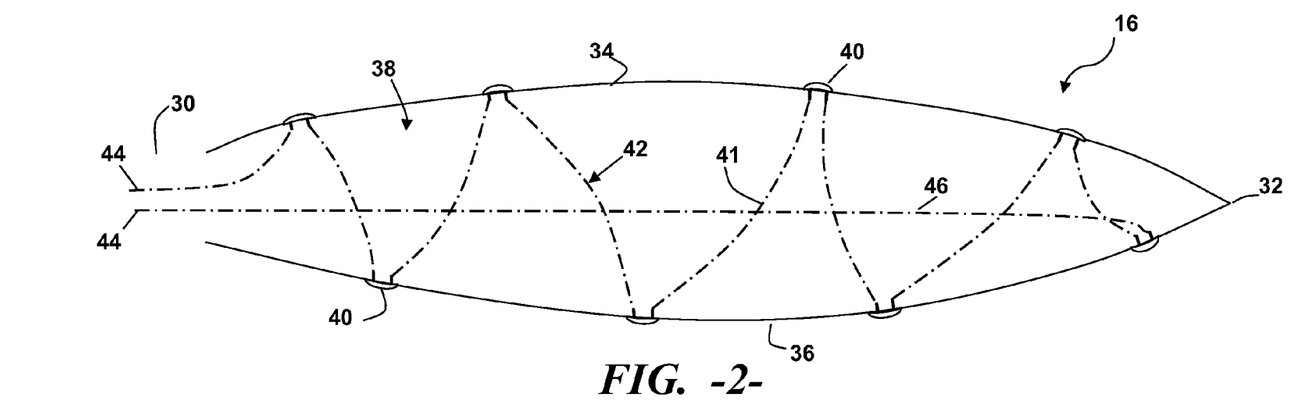
FIG. 2 illustrates a cross-sectional view of a rotor blade with a plurality of lightning receptors connected in series in a continuity circuit.

Referring to FIG. 2, at least one continuity circuit 42 is provided. This circuit is illustrated in the figures as within the internal cavity 38 of blade 16. In other embodiments, the circuit may be defined by components that are embedded in the blade, or are external to the blade 16, for example along the outer surfaces of the blade 16.

The lightning receptors 40 are disposed in series within a respective continuity circuit 42 such that an electrical continuity path defined by the circuit 42 passes through each of the lightning receptors 40 that is contained within the continuity circuit 42. For example, referring to FIG. 2, the lightning receptors 40 are all configured within a single continuity circuit 42. The receptors 40 are daisy-chained together with a plurality of conductive wires (or other conductive members)

41 of suitable size and gauge for conducting a continuity check of all of the receptors 40 within the circuit 42 from the terminal ends 44 of the circuit. It should be understood that the conductive members 41 may also include any configuration of the blade structure within the circuit, such as carbon spar caps, trailing serrations, leading edge protectors, fairings, and so forth. As is well known, the continuity meter (or other continuity-check device) is connected to the terminals 44 and current is supplied to the circuit 42. The measure of return current indicates the continuity of the elements within the circuit 42. Thus, the continuity of each of the lightning receptors 40 within the circuit 42 is verified. If any one of the lightning receptors 40 has been damaged or failed so as to define a break ("open") within the circuit 42, then the continuity circuit check will fail (indicate an open circuit), which indicates to the maintenance technician that at least one of the lightning receptors 40 within the particular blade 16 has failed and needs repair or replacement.

Figure 3:
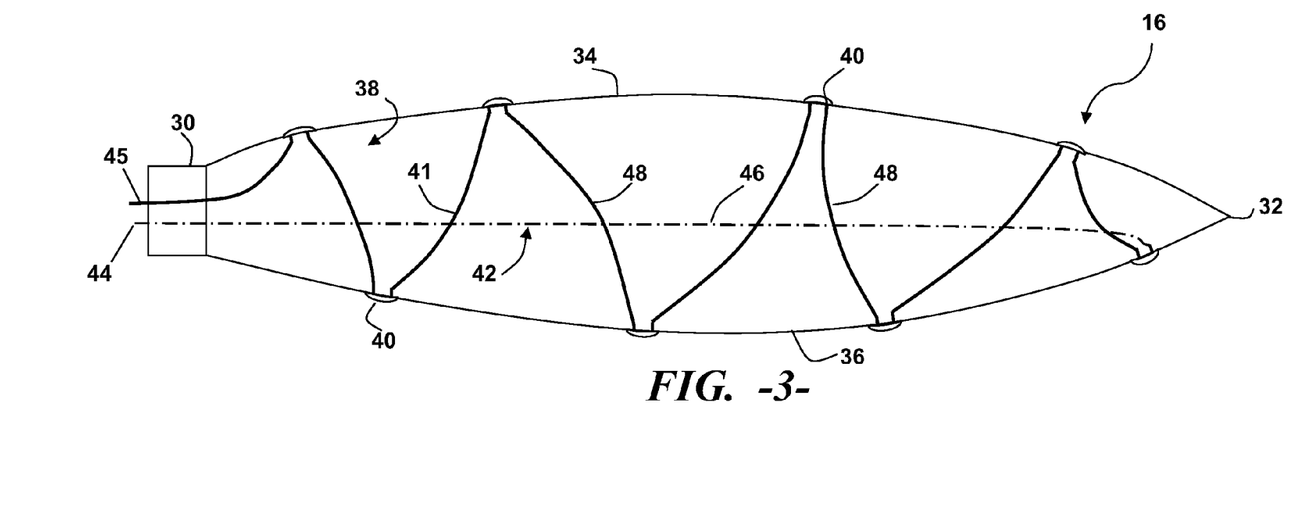
FIG. 3 illustrates the embodiment of FIG. 2 with a leg of the continuity circuit also configured as a lightning conductive path.

The embodiment of FIG. 3 is similar to the embodiment of FIG. 2, with the exception that the conductive members 41 that connect the lightning receptors 40 in series have a gauge suitable for defining a conductive leg 48 for transmitting a lightning strike on any one of the receptors 40 to ground via connection of the conductive terminal 45 to the wind turbine's ground system, as described further below. The conductive leg 48 is emphasized in FIG. 3 by the heavier lines that interconnect the lightning receptors 40. The return leg 46 of the continuity circuit 42 is emphasized by the lighter, hashed line and is generally not suitable as a lightning conductor. The conductive leg 48 is, however, also suitable for conducting the continuity check of the series-configured lightning receptors 40, as discussed above.

Figure 5:
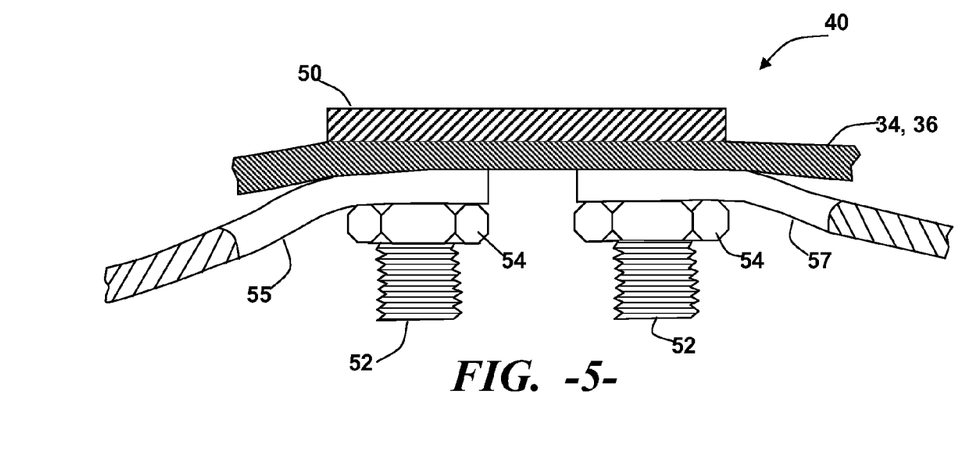
FIG. 5 illustrates a cross-sectional view of an alternative embodiment of a lightning receptor.

The series-connected lightning receptors 40 may be variously configured within the scope and spirit of the invention. In the embodiment of FIGS. 2 and 3, each receptor 40 has a double-post configuration, as in the embodiment of FIG. 5. Referring to FIG. 5, the receptor 40 includes a receptor plate 50 that is mounted on the exposed surface of the pressure side 34 or suction side 36. Conductive posts 52 configured on an underside of the plate 50 extend through holes (not shown) in the pressure side 34 or suction side 36 into the internal cavity 38 of the blade 16. A first conductor 55 (a wire or cable depending on whether the conductor 55 is also part of a lightning conductive leg) is attached to a first one of the post 52. A second wire/cable 57 is attached to the other post 52. The posts 52 may be threaded members and nuts 54 may be conveniently used to securely attach the terminal ends of the wire/cables 55, 57 to their respective post 52, as depicted in FIG. 5.

It can be appreciated from FIG. 5 that, for a continuity check of the lightning receptor 40, current flows from the first wire/cable 55, through the receptor 40 (particularly the plate 50) to the opposite post and connected wire/cable 57. From cable/wire 57, the current flows to the next lightning receptor 40 in the series. A break or other malfunction of the lightning receptor 40 that creates an open in the circuit 42 will cause the circuit check to fail. The embodiments of FIGS. 2 and 3 depict each of the lightning receptors 40 as the double-post configuration of FIG. 5

Figure 4:
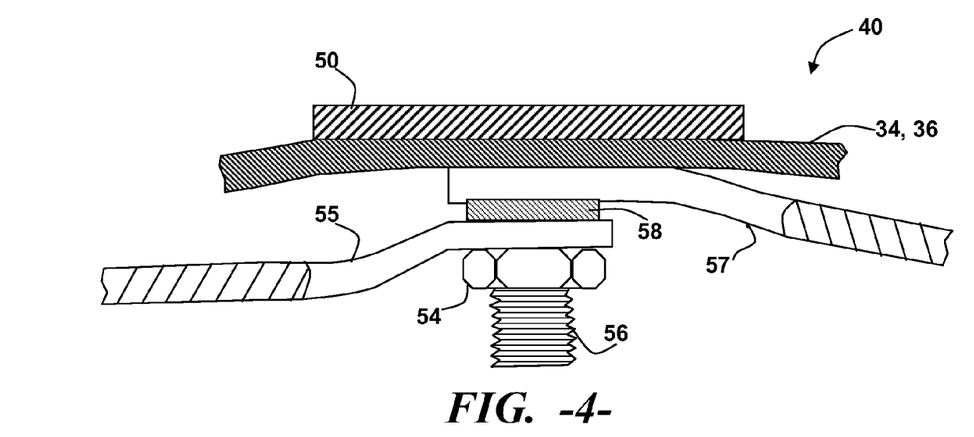
FIG. 4 illustrates a cross-sectional view of an embodiment of a lightning receptor.

FIG. 4 illustrates an alternative embodiment of a lightning receptor 40 wherein a single post 56 extends from the underside of the receptor plate 50. The first 55 and second 57 wire/cables are secured to the post 56 with a nut 54. An insulating dielectric material 58, such as a dielectric washer, separates the terminal ends of the wire/cables 55, 57 to prevent the wire/cables from shorting and eliminating the receptor 40 from the continuity circuit. In an alternate embodiment, the terminal ends are simply spaced apart on the post 56, for example by nuts, and the dielectric material is dispensed with. In this single post 56 configuration, the conductive post 56 is used to convey current from one of the wire/cables to the other wire/cable 55, 57.

Figure 9:
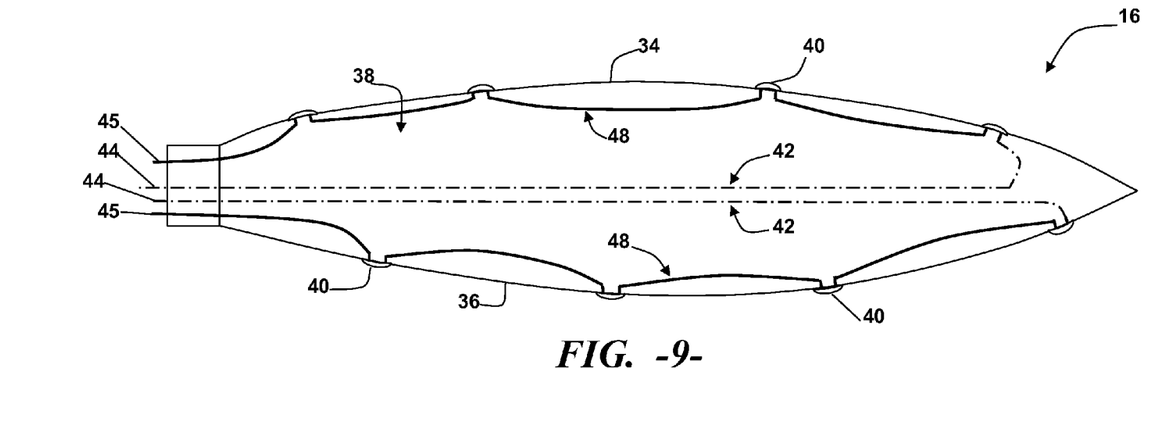
FIG. 9 is a cross-sectional view of an embodiment of multiple continuity circuits within the wind turbine blade with one leg of each circuit also functioning as a lightning conductive path.

Each blade 16 may include a single continuity circuit 42, as depicted in the embodiments of FIGS. 2 and 3, with each of the lightning receptors 40 configured in series within the single circuit 42. In an alternative embodiment depicted for example in FIG. 9, the blade 16 includes a plurality of continuity circuits 42, with each of the lightning receptors 40 configured in one of the respective circuits 42. For example, referring to FIG. 9, the lightning receptors 40 mounted on the pressure side 34 of the blade 16 are contained within a first continuity circuit 42 and the lightning receptors 40 mounted on the suction side 36 are configured in series in a second continuity circuit 42. The portion of the circuit 42 that connects the receptors 40 in series in each of the circuits 42 is also configured as a conductive leg 48. Each of the circuits 42 includes terminals 44 and 45, with terminal 45 being connected to the wind turbine's ground system, as discussed above.

Figure 10:
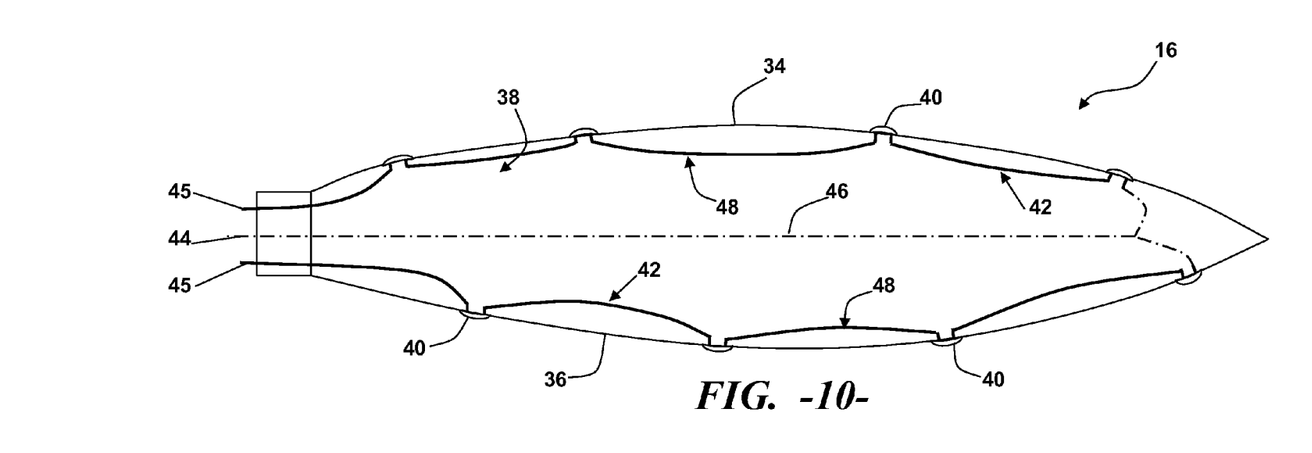
FIG. 10 is a cross-sectional view of an embodiment having multiple continuity circuits that share a return leg.

In still a further embodiment as depicted in FIG. 10, the blade 16 may have multiple continuity circuits 42 that share a common return leg 46. The continuity check can be conducted with the common return leg 46 merely by switching between the terminals 45 when conducting the respective checks.

Figure 6:
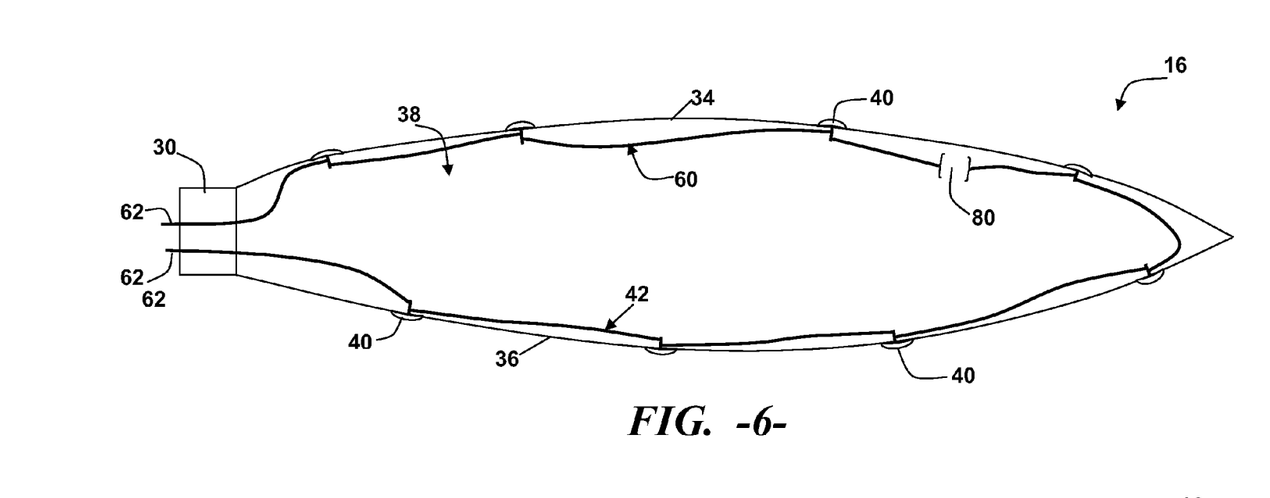
FIG. 6 is a cross-sectional view of an embodiment of a looped lightning conductive path within a wind turbine rotor blade with the lightning receptors of FIG. 4.
Figure 7:
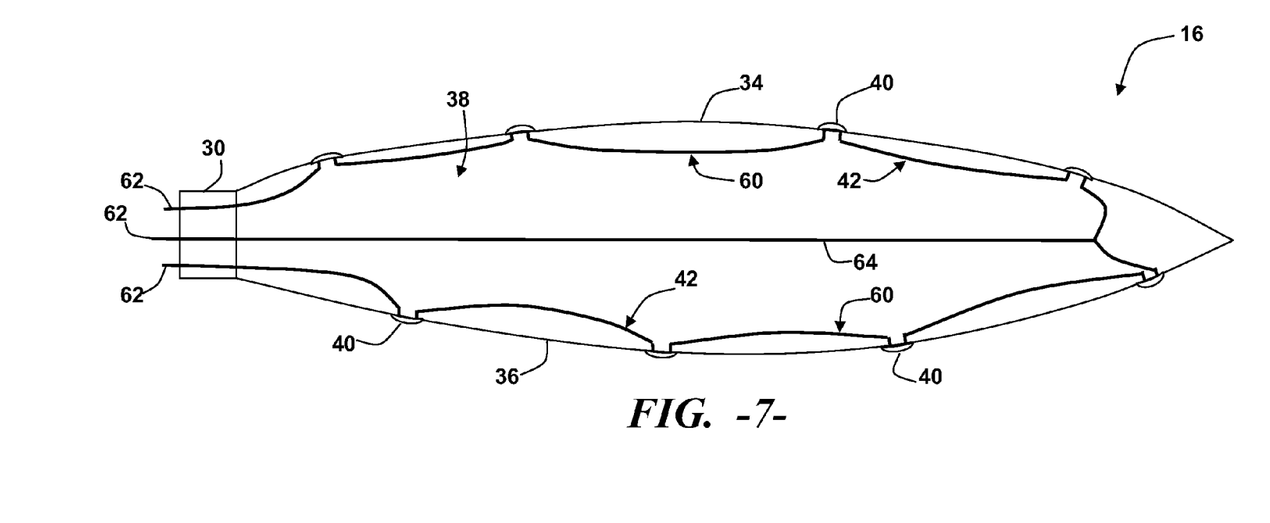
FIG. 7 is a cross-sectional view of still another alternative embodiment of a looped lightning conductive path within a wind turbine rotor blade with the lightning receptors of FIG. 5.

Referring to FIGS. 6 and 7 as an example, the present invention also encompasses blades 16 wherein the entire continuity circuit 42 is defined by conductive members that are also suitable for conducting a lightning strike to the turbine's ground system. For example, referring to FIG. 6, the single continuity circuit 42 that interconnects the receptors 40 in series also defines a looped lightning conductive circuit 60 having terminal ends 62. Each of the terminal ends 62 may be connected to the wind turbine's ground system and may also be used for conducting a continuity check, as discussed above. In other words, the continuity circuit 42 and the looped lightning conductive circuits 60 are defined by the same conductive members, including the receptors 40.

FIG. 7 is similar to the embodiment of FIG. 10 discussed above wherein the multiple continuity circuits 42 share a common return leg 46. In the embodiment of FIG. 7, the common return leg is defined by a lightning conductive leg 64. Thus, each of the continuity circuits 42 also defines a lightning conductive circuit 60 having multiple terminal ends 62. The ends 62 also serve as the terminal ends for the continuity circuits 42.

The terminal ends 44, 45, 62 (whether intended for the continuity circuit 42 or lightning conductive circuit 60, or both) extend through the blade root portion 30, as indicated in the various figures, for access within the rotor hub 18 to which the individual respective turbine blades 16 are mounted. In this manner, a maintenance technician may gain access to the respective terminal ends within the rotor hub 18 for conducting the continuity checks of the respective circuits 42 from within the rotor hub.

Figure 8:
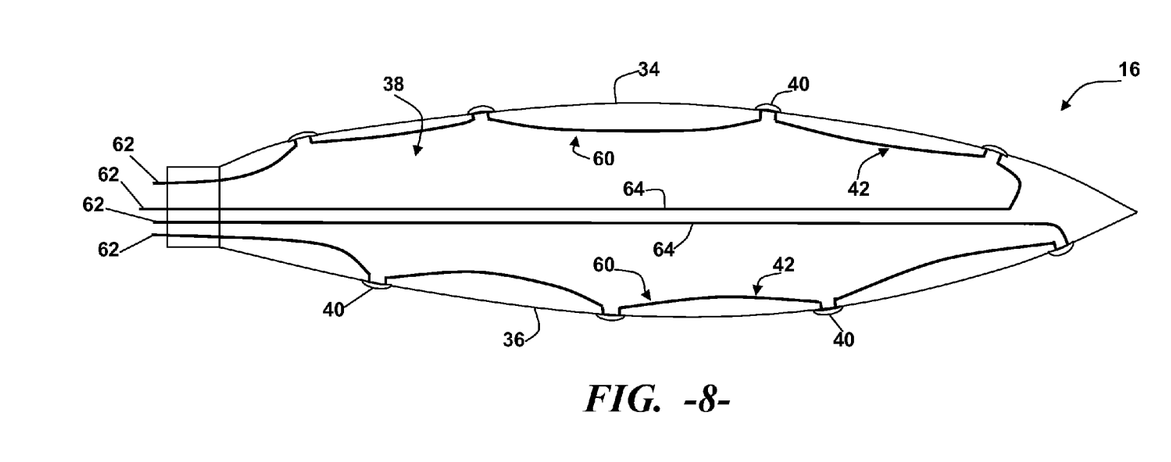
FIG. 8 is a cross-sectional view of an embodiment with multiple looped lightning conductive paths within a wind turbine rotor blade.

It should be appreciated that the present invention also encompasses wind turbine blades that include at least one looped lightning conductive circuit 60 configured with the internal cavity 38 of the blade 16, with the lightning receptors 40 configured in communication with a respective lightning conductive circuit 60 (and not necessarily in series within the circuit 60). Referring to FIGS. 6 through 8, each of the lightning conductive circuits 60 includes terminal ends 62 that connect to the wind turbine's lightning ground system, as discussed in greater detail below with respect to FIG. 12. Thus, the looped lightning conductive circuit 60 provides a redundant ground path to each of the individual receptors 40 for conducting a lightning strike to ground. Referring to FIG. 6 as an example, it can be readily appreciated that a break or "open" in any one of the sections of the lightning conductive circuit 60 between the respective lightning receptors 40 does not result in isolation of any one of the receptors 40. An alternate ground path is established for the receptors 40 via the alternate loop portion of the circuit 60. For example, referring to FIG. 6, a break 80 in the portion of the circuit 60 indicated in the figure does not render any of the lightning receptors 40 ineffective. The receptors 40 on the pressure side 34 to the left of the break 80 are still in communication with the turbine's ground system by way of the upper terminal end 62. The receptor 40 to the right of the break 80 is in electrical continuity with the lower terminal end 62, as are all of the receptors 40 along the suction side 36 of the blade.

It should be understood that any portion of the lightning conductive circuit 60 may include existing blade structure within the circuit, such as carbon spar caps, trailing serrations, leading edge protectors, fairings, and so forth.

Figure 11:
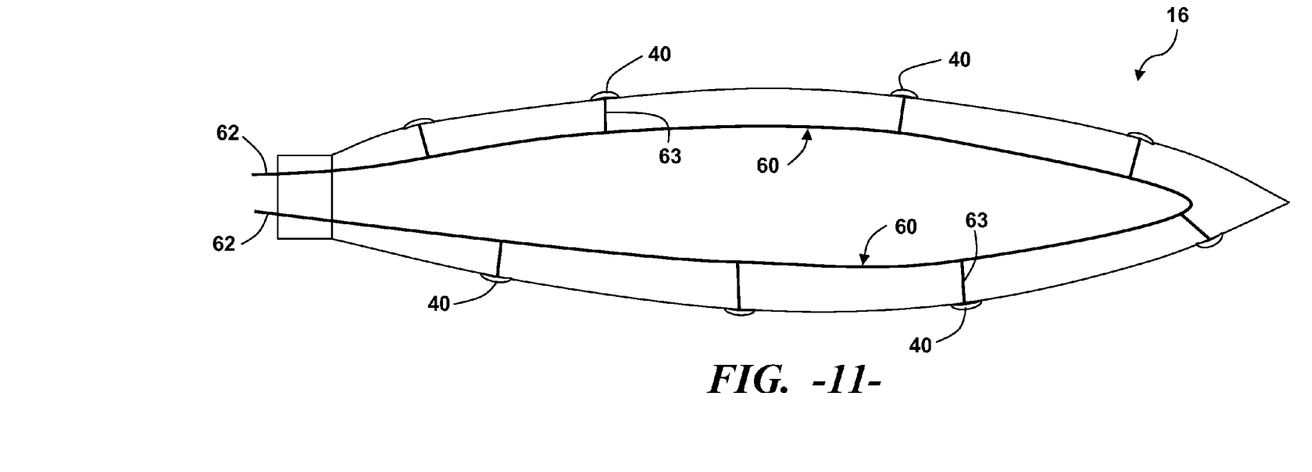
FIG. 11 is a cross-sectional view of an embodiment with a continuous looped conductor; and, FIG. 12 is an illustration of a wind turbine with rotor blades in accordance with aspects of the invention.

Referring to FIG. 11, it should be appreciated that, in the embodiments of the invention drawn particularly to the looped-configuration of a lightning conductive circuit 60 within the blade 16, it is not a requirement that the receptors 40 are configured in series within the loop 60 (as in the embodiments of FIGS. 6 through 8). In the embodiment of FIG. 11, the lightning conductive circuit 60 is defined within the internal cavity 38 by a continuous looped conductor having terminal ends 62. The individual lightning receptors 40 are connected in a T-connector configuration with a branch connector 63, and are thus not in series within the circuit 60. It should, however, be appreciated that the configuration of the circuit 60 depicted in FIG. 11 cannot be used to separately conduct a continuity check of the receptors 40, as is possible with the embodiments of FIGS. 6 through 8, as discussed above.

Each blade 16 may include a single lightning conductive circuit 60, as illustrated in FIG. 6, or multiple circuits 60 as illustrated in FIGS. 7 and 8. In the embodiment of FIG. 7, the separate circuits 60 share a common return leg 64, whereas in the embodiment of FIG. 8, each of the circuits 60 has an individual respective return leg 64. Each of the terminal ends 62 (in all of the embodiments of FIGS. 6 through 8) is individually connected to the wind turbines' ground system in the rotor hub 18. Thus, each looped lightning conductive circuit 60 provides redundant ground paths for the receptors 40 within the respective loop 60.

It should be appreciated that the invention also encompasses any manner or configuration of wind turbine 10 having blades 16 utilizing any one of the aspects described herein. For example, referring to FIG. 12, the wind turbine 10 includes at least one turbine blade 16 having a plurality of lightning receptors 40 configured along either or both sides of the blade 16. In the illustrated embodiment, each of the blades 16 is configured in a similar manner. Each blade 16 includes at least one looped lightning conductive circuit 60 configured within the internal cavity of the blade, with the lightning receptors 40 of each blade configured in communication with a respective lightning conductive circuit 60. As discussed above, the blade 16 may include multiple circuits 60. The respective lightning conductive circuits 60 include terminal ends that extend through the root portion of the blades 16 and are individually connected to a grounding system within the rotor hub 18. The grounding system may be variously configured, as is well known in the art. For example, the grounding system may include any manner of the wind turbine's machinery or support structure, including blade bearings, machinery bed plates, tower structure, and the like, that defines any suitable ground conductive path 68 from the blades 16, through the tower 12, to a ground rod 70 via a ground cable 72, or other suitable electrical ground path.

Figure 12:
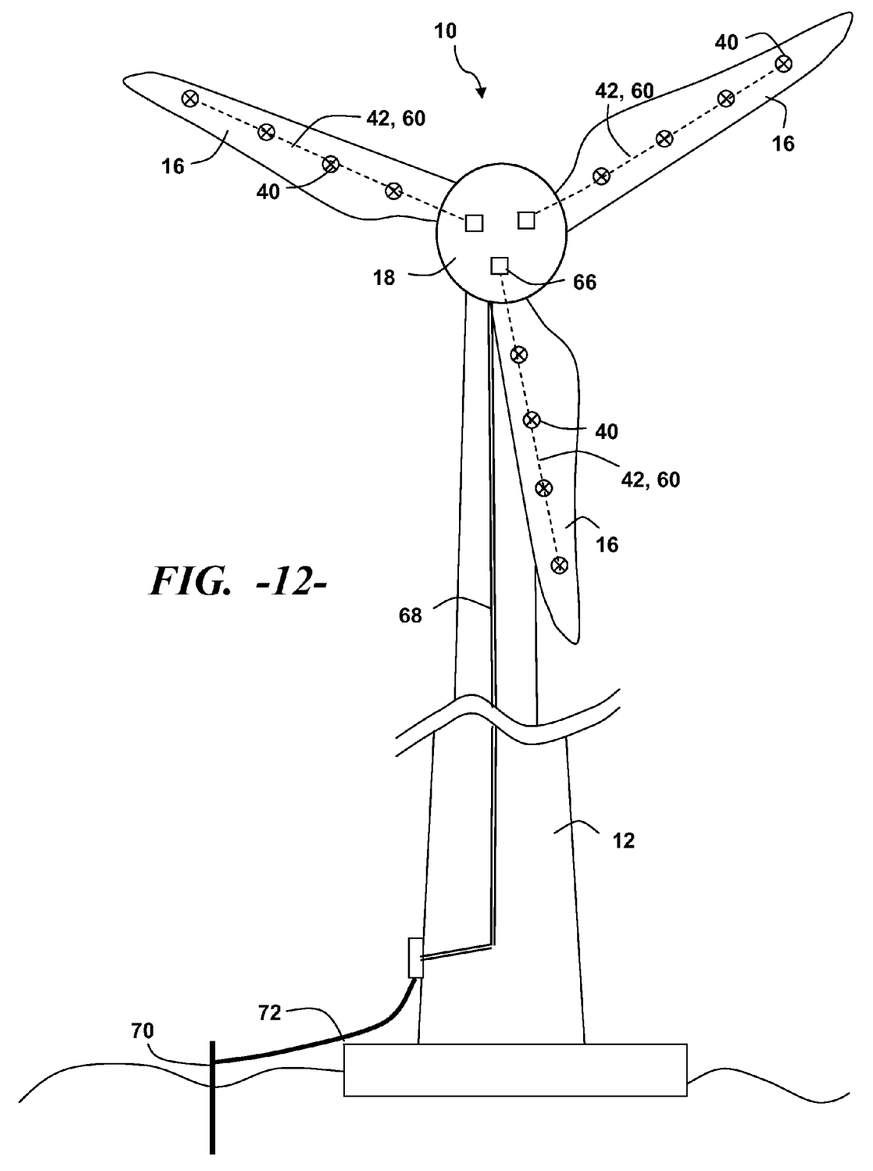

In a desirable embodiment as discussed above, the individual lightning receptors 40 are configured in series within the lightning conductive circuit 60 so that the circuit 60 may also function as a continuity circuit 42 for verifying the continuity of the individual receptors 40. In this regard, a relay station 66 defining any manner of suitable access or switching capability to the terminal leads 62 may be supplied within the rotor hub 18, whereby a maintenance technician may access the respective stations for conducting the continuity circuit checks, as described above. In other embodiments, one or more relay stations 66 may provide for automatic electronic switching between the various circuits 42 in a periodic or continuous monitoring or diagnostic procedure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
   a root, a tip, and a pressure side and a suction side extending between said tip and said root, said pressure side and said suction side defining an internal cavity;
   a plurality of lightning receptors configured along either or both of said pressure side or said suction side;
   at least one looped lightning conductive circuit, said lightning receptors configured in communication with a respective said lightning conductive circuit; and,
   said lightning conductive circuit comprising terminal ends that extend through said root for connection of each said terminal end with a grounding system within a wind turbine;
   wherein said looped lightning conductive circuit provides a redundant path to each said lightning receptor for conducting a lightning strike to ground.

2. The wind turbine blade as in claim 1, comprising a plurality of said looped lightning conductive circuits, each said lightning conductive circuit comprising a plurality of said lightning receptors.

3. The wind turbine blade as in claim 2, wherein said looped lightning conductive circuits share a common return leg.

4. The wind turbine blade as in claim 1, wherein said terminal ends are configured for connection to the wind turbine grounding system within a hub of the wind turbine.

5. A wind turbine rotor blade, comprising:
   a root, a tip, and a pressure side and a suction side extending between said tip and said root, said pressure side and said suction side defining an internal cavity;
   a plurality of lightning receptors configured along either or both of said pressure side or said suction side;
   at least one looped lightning conductive circuit, said lightning receptors configured in communication with a respective said lightning conductive circuit;

said lightning conductive circuit comprising terminal ends that extend through said root for connection of each said terminal end with a grounding system within a wind turbine wherein said looped lightning conductive circuit provides a redundant path to each said lightning receptor for conducting a lightning strike to ground; and wherein said lightning receptors are configured in series within said looped lightning conductive circuit.

6. The wind turbine blade as in claim 5, wherein said looped lightning conductive circuit defines a continuity circuit for said lightning receptors in series within said looped lightning conductive circuit.

7. A wind turbine, comprising:
a plurality of turbine blades mounted to a rotor hub, each of said turbine blades comprising a root, a tip, and a pressure side and a suction side extending between said tip and said root;
at least one of said turbine blades further comprising
a plurality of lightning receptors configured along either or both of said pressure side or said suction side;
at least one looped lightning conductive circuit, said lightning receptors configured in communication with a respective said lightning conductive circuit; and,
said lightning conductive circuit comprising terminal ends that extend through said root and are each respectively connected to a grounding system within said hub;
wherein said looped lightning conductive circuit provides a redundant path to each said lightning receptor for conducting a lightning strike to ground.

8. The wind turbine as in claim 7, comprising a plurality of said looped lightning conductive circuits within said turbine blade, each said lightning conductive circuit comprising a plurality of said lightning receptors.

9. The wind turbine as in claim 8, wherein said looped lightning conductive circuits share a common return leg.

10. A wind turbine, comprising:
a plurality of turbine blades mounted to a rotor hub, each of said turbine blades comprising a root, a tip, and a pressure side and a suction side extending between said tip and said root,
at least one of said turbine blades further comprising
a plurality of lightning receptors configured along either or both of said pressure side or said suction side;
at least one looped lightning conductive circuit, said lightning receptors configured in communication with a respective said lightning conductive circuit;
said lightning conductive circuit comprising terminal ends that extend through said root and are each respectively connected to a grounding system within said hub;
wherein said looped lightning conductive circuit provides a redundant path to each said lightning receptor for conducting a lightning strike to ground; and
wherein said lightning receptors are configured in series within said looped lightning conductive circuit.

11. The wind turbine as in claim 10, wherein said looped lightning conductive circuit defines a continuity circuit for said lightning receptors in series within said looped lightning conductive circuit.

12. The wind turbine as in claim 11, wherein each said turbine blade is configured as in claim 11, and further comprising a relay station within said rotor hub for periodic or continuous continuity checking of said lightning receptors within each of said blades.

* * * * *